June 2, 1953  G. C. WHITE  2,640,898
SAFETY CUTOFF SWITCH FOR TRACTORS
Filed April 25, 1950
Fig. 1
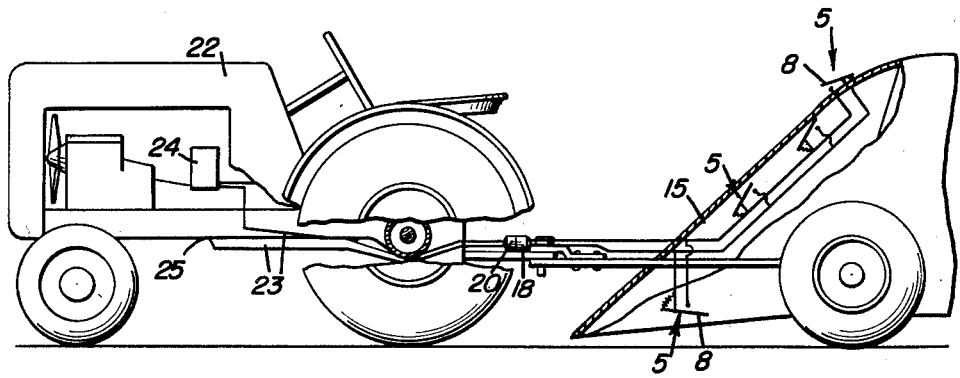
Fig. 2
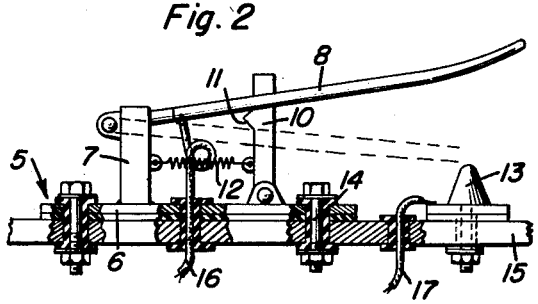
Fig. 3
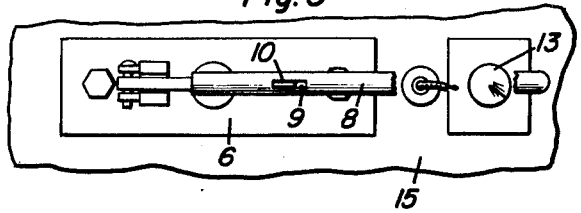
Fig. 5
Fig. 6
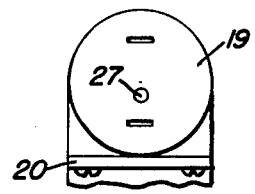
Fig. 4
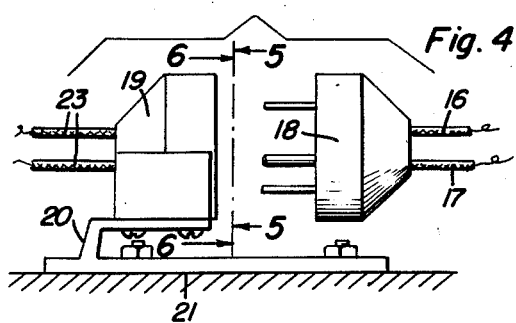
Gerald C. White
INVENTOR.

Patented June 2, 1953

2,640,898

UNITED STATES PATENT OFFICE 2,640,898

SAFETY CUTOFF SWITCH FOR TRACTORS

Gerald C. White, Macon, Ill.

Application April 25, 1950, Serial No. 157,925

2 Claims. (Cl. 200—169)

The present invention relates to new and useful improvements in safety devices for tractors and more particularly to a safety cut-off switch for the ignition system of a tractor placed at a strategic point on a corn picker or other implement drawn by the tractor to instantly cut-off the power for the tractor in case of emergency.

In operating various types of farm machinery from the power take-off of a tractor or by the movement of the tractor, an attendant riding on and operating the machine may become injured by his hands or clothing becoming entangled with parts of the machine and before the driver of the tractor is warned to stop the tractor. Accordingly, it is an object of the present invention to provide a control switch or switches within easy reach of an attendant on a farm machine whereby the attendant, when confronted with a dangerous situation, may instantly cut off the power plant used for driving the machine.

A further object is to provide a series of cut-off switches on the farm machine and arranged whereby any one of the switches will cut off the power plant.

Another object is to provide a novel switch construction per se for use in the manner indicated.

A still further object is to provide a safety device for farm machines of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a tractor and farm implement equipped with the invention and with parts shown in section;

Figure 2 is an enlarged side elevational view of one of the switches;

Figure 3 is a top plan view thereof;

Figure 4 is an enlarged side elevational view of the plug and socket connection mounted on the draw bar of the tractor;

Figure 5 is a rear elevational view of the socket and,

Figure 6 is a front elevational view of the plug.

Referring now to the drawing in detail, wherein for the purpose of illustration I have disclosed a preferred embodiment of my invention, the numeral 5 designates one of the switches generally and which comprises a base or attaching plate 6 having a post 7 rising therefrom and to the upper end of which is pivoted a switch arm 8 having a slot 9 therein for receiving a catch 10 which is pivoted at one end on plate 6. Catch 10 is formed with a tapered dog 11 held in engagement on top of or under switch arm 8 by a coil spring 12 connecting the catch to the post and pulling the catch toward the post.

A dome-shaped contact 13 is positioned under the free end of switch arm 8 for engagement by the arm when the latter is moved downwardly and is held in contacting engagement by catch 10.

One or more of the switches 5 are attached by means of insulated bolts and nuts 14 at strategic points on a farm machine, such as a corn picker 15, within easy reach of an attendant riding thereon, and circuit wires 16 and 17 lead respectively from switch arm 8 and contact 13 to an electric plug 18 for attaching to an electric socket 19 secured to a bracket 20 attached to the draw bar 21 of a tractor 22. Circuit wires 23 lead from the socket 19 to a part of the ignition system of the tractor, such as a magneto 24 and to a ground 25 on a part of the tractor.

Plug 18 is provided with a pin 26 entering a recess 27 in the socket 19 to properly aline the plug and socket.

The farm machine 15 may be operated by the power take-off (not shown) of the tractor or by the wheels of the machine when pulled by the tractor, and the switches 5 are each connected in series with the ignition system and a ground, whereby the closing of any one of the switches will ground the ignition system of the tractor to cut off the engine and thus stop the operation of the farm machine.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a tractor having an engine ignition system and a power operated machine connected to and driven by the tractor with a manually operable ignition cut-off switch mounted on the machine whereby the tractor ignition system may be cut-off from the machine, the improvement comprising; said switch including a base, a standard on said base, a switch arm pivoted at one end to said standard and having a longitudinally extending slot intermediate its ends, an elongated catch pivoted at one end to said base, said catch being slidably received in said switch arm slot, a dog integral with one edge of said catch, a spring extending between and secured at its ends to said standard and said catch to yieldingly urge said catch toward said standard, said dog engaging said switch arm adjacent said slot for selectively holding the arm in a raised or lowered position, a contact on said base engaging said switch arm when the arm is in lowered position, a conductor leading from said switch arm to said tractor ignition circuit and a conductor leading from said contact to a ground terminal on said tractor, said switch arm grounding said ignition circuit when in lowered position whereby the ignition system is cut off.

2. A manually operable ignition cut-off switch comprising a base, a standard mounted on said base, a switch arm pivoted at one end to said standard and having a longitudinally extending slot intermediate its ends, an elongated catch pivoted at one end to said base, said catch being slidably received in said switch arm slot, a dog integral with one edge of said catch, a spring extending between and secured at its ends to said standard and said catch to yieldingly urge said catch toward said standard, said dog engaging said switch arm adjacent said slot for selectively holding the arm in a raised or lowered position and, a contact on said base engaging said switch arm when the same is in lowered position.

GERALD C. WHITE.

References Cited in the file of this patent

UNITED STATES PATENTS

| Number | Name | Date |
|---|---|---|
| 982,869 | Pringle | Jan. 31, 1911 |
| 1,220,982 | Hamilton | Mar. 27, 1917 |
| 1,262,456 | Colwell | Apr. 9, 1918 |
| 1,326,369 | Pocock | Dec. 30, 1919 |
| 1,566,508 | Sandberg | Dec. 22, 1925 |
| 1,658,325 | Bragg et al. | Feb. 7, 1928 |
| 1,855,838 | Kranick | Apr. 26, 1932 |
| 2,250,754 | Dooley | July 29, 1941 |

FOREIGN PATENTS

| Number | Country | Date |
|---|---|---|
| 548,941 | Germany | Apr. 21, 1932 |